United States Patent [19]

Gonzalez

[11] 4,055,162
[45] Oct. 25, 1977

[54] SOLAR ENERGY COLLECTOR

[76] Inventor: Ed Gonzalez, 2284 NE. 1st Ave., Boca Raton, Fla. 33432

[21] Appl. No.: 679,898

[22] Filed: Apr. 26, 1976

[51] Int. Cl.² .............................................. F24J 3/02
[52] U.S. Cl. ................................... 126/271; 165/169; 165/171
[58] Field of Search ............... 126/270, 271; 237/1 A; 165/169, 170, 171, 172

[56] References Cited
U.S. PATENT DOCUMENTS

| 2,311,579 | 2/1943 | Scott | 126/271 |
| 3,039,453 | 6/1962 | Andrassy | 126/271 |
| 3,194,228 | 7/1965 | Bargues | 126/271 |
| 3,254,644 | 6/1966 | Thannhauser | 126/271 |

Primary Examiner—Kenneth W. Sprague
Assistant Examiner—James C. Yeung

[57] ABSTRACT

A solar collector in the form of a shell having an upper face of heat-conductive material with recesses and a serpentine coil arranged in the recesses and in a snug fit in heat exchanging relation with the heat absorbing material and said coil comprising a tubular length with an inlet and an outlet opening whereby material to be heated may be flowed through said coil.

10 Claims, 4 Drawing Figures

SOLAR ENERGY COLLECTOR

FIELD OF THE INVENTION

This invention relates to solar equipment and, more particularly, to an improved collector for solar energy.

BACKGROUND OF THE INVENTION

In the past there have been numerous types of solar energy devices. Such devices have in common the use of a collector, conventionally a copper tube in heat exchanging relation to a black surface on which rays from the sun impinge. This invention has as an object an improved solar collector which is composed of fiberglass material, preferably molded in one piece and which provides a surface over which a serpentine coil is arranged in heat exchanging relation, which is relatively inexpensive to manufacture and which is long lasting and resistant to weather and most corrosive elements. It is a further object of this invention to provide an improved collector of the type described in the preceding sentence which includes insulation material and which is provided with a clear acrylic, impact resistant, transparent cover for the coil and support surface therefor.

It is a general object of this invention to provide an improved yet inexpensive structure for use in solar energy devices.

In accordance with these and other objects which will become apparent hereinafter, the instant invention will now be described with reference to the accompanying drawings in which:

DESCRIPTION OF PREFERRED EMBODIMENT

Figure 1:
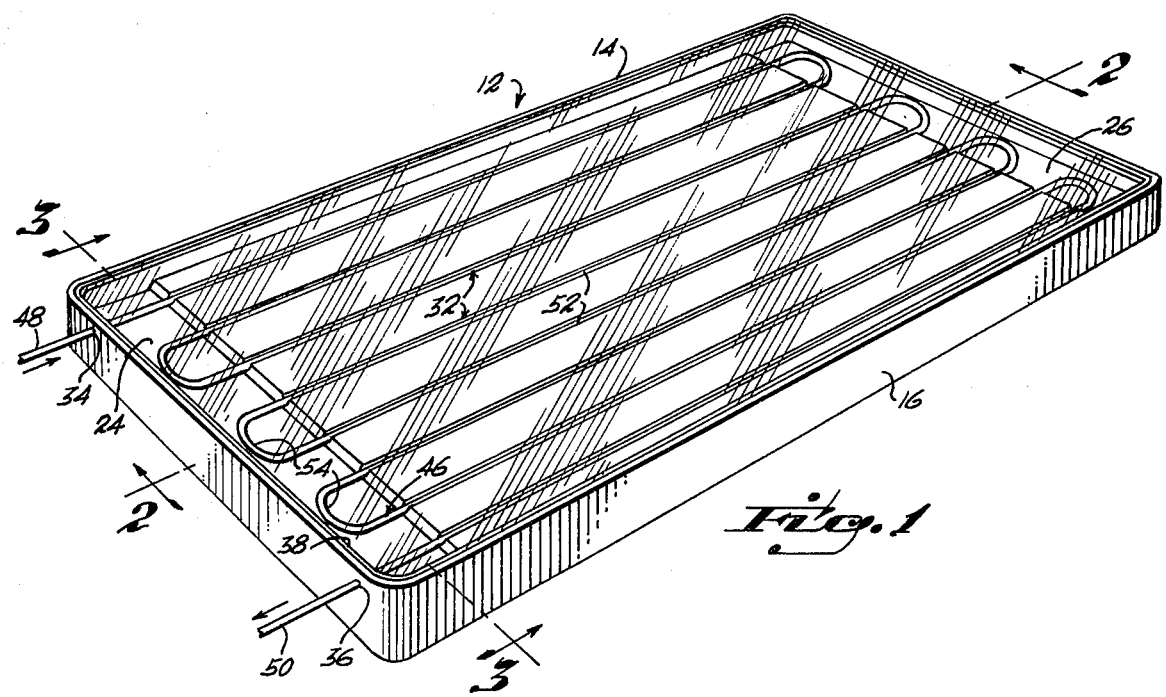
FIG. 1 is a perspective view of a solar collector constructed in accordance with the instant invention.
Figure 2:
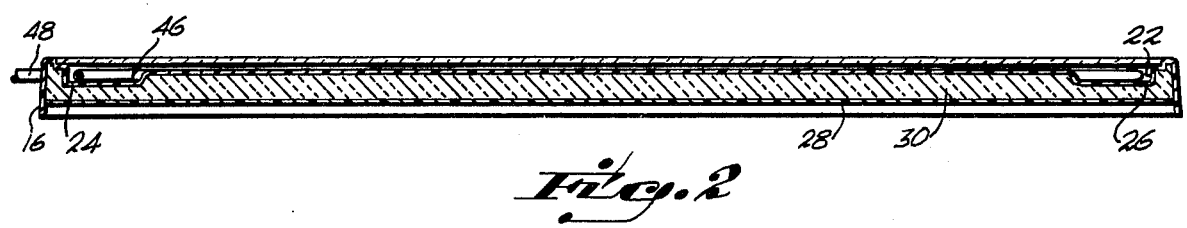
FIG. 2 is a view in cross section taken on the plane indicated by line 2—2 of FIG. 1 and looking in the direction of the arrows.
Figure 3:
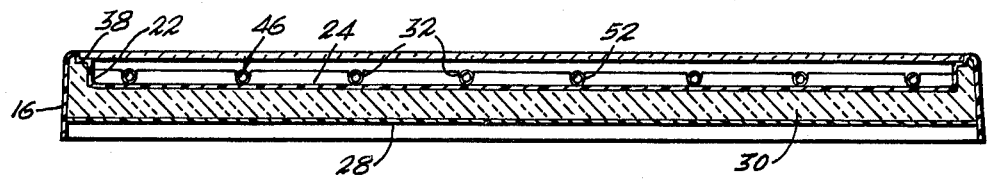
FIG. 3 is a view taken on the plane indicated by line 3—3 of FIG. 1 and looking in the direction of the arrows.
Figure 4:
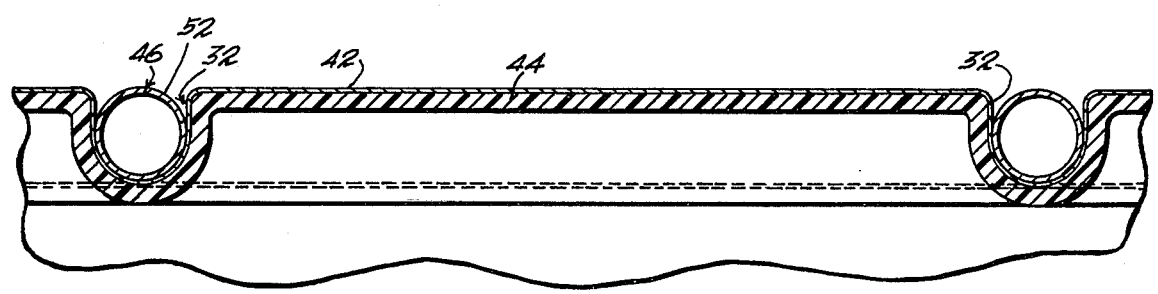
FIG. 4 is an enlarged cross section of a portion of the top zone of FIG. 3.

Referring to the drawings wherein like reference characters designate corresponding parts throughout the several views, the numeral 12 generally designates the collector which is generally in the form of an open shell. It includes a peripheral rim 14 with an outward, downwardly extending peripheral skirt 16 which terminates at a support surface. Within the shell a floor is provided. It is connected to the rim by an inner, downwardly extending skirt 22 in the preferred embodiment illustrated. The floor has a first end zone 24 and a second end zone 26 which is slightly recessed with respect to the main plane of the floor that is, it lies between the main plane of the floor and the support surface of the skirt. Also, in the preferred embodiment the shell is spanned by a septum 28 which extends between the skirt, spanning it, and defining a space between the support surface and the floor which, in the preferred embodiment is filled with insulation 30. Across the floor and extending between the end zones there are a plurality of elongate spaced parallel recessed portions such as 32 which are of a common cross section. The shell is also provided with an inlet opening 34 and an outlet opening 36 for passage of a copper tube which comprises a portion extending through the opening. In the preferred embodiment illustrated a peripheral recess is provided in the rim as at 38 defining a shoulder to nest a transparent sheet of material, with the sheet margins being supported by the shoulder. In the preferred embodiment the exterior of the skirt rim and floor are provided with a smooth gel coat finish and which comprises a coating for a structure of reinforced plastic or fiberglass as indicated by the numeral 44. In the preferred embodiment the transparent sheet is of clear acrylic, impact resistant, plastic in the rigid range. A continuous copper coil 46 is provided. The copper coil includes a first end 48 and a second end 50 which are portions which in the preferred embodiment extend through the openings 34 and 36 of the shell. The cross sectional area of the tube is sized to nest in the elongate floor recesses and, as shown in FIG. 4, for example, and the coil is in the form of a serpentine pattern, see FIG. 1, defining longitudinally extending portions such as 52 which are spaced from one another a distance the same as the distance between the floor recesses, and each of the longitudinally extending portions are interconnected by arcuate portions, such as 54 which are received on the lower portions of the floor. Nipple means may be provided in the openings 34 and 36 for attachment of the copper tube coil ends to a supply of liquid for a purpose now to be described.

The collector may be utilized in a variety of installations. Being of molded fiberglass, in one piece primarily, comprising a casing with a smooth gel coat finish, it is long-lasting and resistant to weather and most corrosive elements and, additionally, may be manufactured in a plant and readily transported to a job site. The provision of the space between the septum and the floor bounded by the skirts permits of insulation material to accommodate substantially high temperatures. The rigid transparent plastic material of the cover panel is unaffected by weather, salt and many generally encountered corrosive agents. The floor, including the grooves or elongate recesses, is covered with a thin layer or foil sheet 42 of copper or highly heat-conductive material thereby reducing the amount of relatively expensive material which must be utilized. Moreover, the serpentine pattern is mechanically bonded to the copper foil material and pressure set into the grooves or elongate recesses formed in the fiberglass floor. This is accomplished by reason of the structure illustrated wherein the grooves are of such dimension that the added thickness of the copper tube plus that of the copper foil material or sheet and the diameter of the tube passageway is somewhat greater than the diameter of the lower zone of the groove or elongate recesses, as seen in cross section; and the surface of the groove is in contact with copper sheet through at least about 180° of its circumference. This eliminates the need to fasten, as by soldering, etc., to maintain the mechanical contact for heat exchange between the copper sheet and the tube; and it insures a high area of heat exchanging contact per lineal foot. The copper tubing is of water quality or plumbing quality which is of the highest resistance to corrosion and provides great heat transferability. Thus, the unit may be furnished in a condition ready for installation with no additional glazing, molding or cementing being required. In short, the item may be manufactured and assembled as a collector which is relatively portable and which may then be transported to a job site for installation.

Uses of the collector are in hot water heating and domestic, institutional or commercial installation. It may also be used for space heating of homes and commercial buildings as well as for heating swimming pools and numerous other types of special applications.

In a preferred embodiment the height of the shell, that is the height of the skirt, is about four and one-half inches and the overall dimensions are about 99 to 100 inches between the skirt at the floor end zones and about 50 inches wide. In other words, the device will have an overall length of about 8 feet and an overall width of about 4 feet. Its weight will be in the order of about 150 pounds and, in the preferred embodiment the serpentine type coil is of a continuous length of about ⅜ inch o.d. copper tubing which is mechanically bonded to the copper sheet covering the floor providing about 11.7 square inches of contact for heat exchanging per lineal foot of tubing. Any suitable flat black high temperature selective coating may be utilized. Preferably the shell or casing is of molded fiberglass reinforced polyester which is sealed under an absorber plate and is completely weatherproof. The insulation layer is preferably between 1 and 2 inches thick and comprises rigid foam sheet insulation which is precurred and preexpanded before installation defining a cellular layer. Thus, all four sides and the bottom are fully insulated and enclosed within the fiberglass casing or shell and septum. The cover may be of any suitable plexiglass, such as ⅛ inch thick sheet form material cemented to the peripheral recess. It should have a solar transmittance which is relatively high, preferably about 90% and a "U" value of about 0.98 at 7½ miles per hour wind velocity. In the preferred embodiment the pipe connections are of ¾ feet male NPT type. The sepentine coil when in position on the floor may be fastened thereto by members extending perpendicularly thereacross between the skirt and secured to the floor thereby insuring tight heat-conducting engagement of the coil surfaces and the floor covering of black copper material. It is thus seen that there is provided a relatively inexpensive highly efficient portable unit which may be readily manufactured at a convenient location and transported to a job site for installation.

What is claimed is:

1. A solar collector comprising:
an open shell, said shell comprising a rim with an outer downwardly extending skirt terminating at a support surface, and a floor within the skirt, said floor having a first end zone and a second end zone between the floor and the support surface defining spaced lower end floor zones and said shell including a septum spanning the skirt between the lower floor zones and the support surface defining a space between the floor and septum, and said floor having a plurality of elongate, spaced, parallel recessed portions of generally U-shaped, cross section extending between the end zones, and the base zone of the recessed portions being semi-circular in cross section and of a predetermined radius of curvature, and said shell having an inlet and outlet opening.

2. The device as set forth in claim 1 wherein a layer of heat conductive material is provided completely covering the floor between the end zones, said layer having a predetermined thickness in said recesses and conforming to the shape of the recesses.

3. The device as set forth in claim 1 wherein said shell includes an inner skirt extending from said rim to said floor and said inner skirt and said rim is provided with a recess at the rim and above said floor; and a transparent sheet spanning the shell, said sheet having margins and said margins being nested in said rim recess.

4. The device as set forth in claim 1 wherein said skirt rim and floor of said shell are of one-piece molded reinforced plastic.

5. The device as set forth in claim 1 wherein insulation material is provided in the space between the floor and the septum.

6. The device as set forth in claim 1 wherein the shell is of molded fiberglass having a smooth gel coat finish on the surface of the floor facing away from the support surface and on the rim and skirt facing outwardly from said space.

7. The device as set forth in claim 2 wherein said sheet is of clear acrylic, impact resistant, transparent plastic in the rigid range.

8. The device as set forth in claim 2 wherein a copper coil is provided, said copper coil having a first end and a second end, said coil being in the form of a serpentine pattern including (a) longitudinally extending parallel portions spaced from one another a distance the same as the distance between the floor recesses, each of said longitudinally extending portions being circular in cross section and of a uniform outside diameter slightly greater than twice said radius of curvature of the base of the longitudinally extending recesses when said layer is on said floor, and each is nested and held in heat exchanging relation in one of the elongate floor recesses of said floor and (b) arcuate portions interconnecting the longitudinally extending portions and received on the lower end floor zones of the floor; and means are provided to connect the first end of the coil through the inlet opening and the second end of the coil through the outlet opening.

9. The device as set forth in claim 8 wherein the coil is of copper tubing.

10. The device as set forth in claim 2 wherein the surface of the layer facing away from the support surface is black between the end zone, except between the coil and the layer.

* * * * *